United States Patent [19]

Yasrebi et al.

[11] Patent Number: 5,407,001
[45] Date of Patent: Apr. 18, 1995

[54] YTTRIA-ZIRCONIA SLURRIES AND MOLD FACECOATS FOR CASTING REACTIVE METALS

[75] Inventors: Mehrdad Yasrebi, Clackamas; William W. Kemp, Milwaukie; David H. Sturgis, Gladstone, all of Oreg.; Douglas G. Nikolas, Battleground, Gary L. Wright, Brush Prairie; both of Wash.; Thomas J. Kelly, III, Greshan; Mark E. Springgate, Portland; Ted R. Crego, Gladstone, all of Oreg.

[73] Assignee: Precision Castparts Corporation, Portland, Oreg.

[21] Appl. No.: 89,259

[22] Filed: Jul. 8, 1993

[51] Int. Cl.$^6$ ............................. B22C 1/06; B22C 9/04
[52] U.S. Cl. .................................. 164/519; 106/38.35
[58] Field of Search ............... 164/519; 106/38.9, 38.3, 106/38.35

[56] References Cited

U.S. PATENT DOCUMENTS

| | | |
|---|---|---|
| 3,545,987 | 12/1970 | Anderson . |
| 3,955,616 | 5/1976 | Gigliotti, Jr. et al. . |
| 4,703,806 | 11/1987 | Lassow et al. . |
| 4,787,439 | 11/1988 | Feagin ............................. 106/38.9 |
| 4,947,927 | 8/1990 | Horton . |
| 4,996,175 | 2/1991 | Sturgis . |

FOREIGN PATENT DOCUMENTS

| | | | |
|---|---|---|---|
| 4-178234 | 6/1992 | Japan .................................. 164/519 |
| 4-300047 | 10/1992 | Japan .................................. 164/519 |

OTHER PUBLICATIONS

Helferich and Zanis, "An Investigation of Yttrium Oxide as a Crucible Material for Melting Titanium," Dept. of Navy (Jan. 1973).
Calvert, "An Investment Mold for Titanium Casting," Bureau of Mines Report of Investigation (1981).
Schuyler, "Third Interim Technical Report Development of Titanium Alloy Casting Technology," Report No. 74-310796(03) (Jan. 1, 1975).
Feagin, "Casting of Reactive Materials Into Ceramic Molds," Sixth World Conference on Investment Casting 4:01-4:13.
Schuyler et al., "Development of Titanium Alloy Casting Technology," 275-279, Airesearch Manufacturing Company of Arizona Report No. AFML-TR-76-80 (Aug. 1976).
Searle, "Refractory Materials: Their Manufacture and Uses," 122 (1917).
Searle, "Refractory Materials: Their Manufacture and Uses" (Second Edition), 194-196 (1924).
Norton, "Refractories" (Third Edition), 302-339 (1949).

*Primary Examiner*—Kuang Y. Lin
*Attorney, Agent, or Firm*—Klarquist, Sparkman, Campbell, Leigh & Whinston

[57] ABSTRACT

The disclosure describes an aqueous ceramic slurry having from about 70-weight percent to about 85 weight-percent of a fused yttria-zirconia material. The weight percent of zirconia in the fused yttria-zirconia preferably varies from about 1.0 weight percent to about 10.0 weight percent. Fused slurries may comprise, in addition to fused yttria-zirconia, an inorganic binder (preferably silica), an organic binder (preferably a latex binder), a surfactant (preferably a sodium dioctyl sulfosuccinate), an antifoaming agent (preferably a water-dilutable active silicone defoamer) and titanium dioxide. The slurries of the present invention are used to form ceramic mold facecoatings for casting reactive materials. These slurries are less sensitive to pH fluctuations than are slurries made from 100 percent yttria (yttria slurries). Moreover, slurries as described in the disclosure do not gel prematurely, and exhibit substantially the same formation of oxygen-enriched titanium (alpha case) than do yttria slurries.

20 Claims, 2 Drawing Sheets

YTTRIA-ZIRCONIA SLURRIES AND MOLD FACECOATS FOR CASTING REACTIVE METALS

FIELD OF THE INVENTION

This invention concerns an aqueous yttria-zirconia slurry used to form ceramic molds.

BACKGROUND OF THE INVENTION

Yttria is a relatively inert refractory material. A refractory material is any of various substances, such as ceramics, that are characterized by their suitability for use as structural materials at high temperatures. Refractory materials often are used for casting reactive or corrosive materials, including reactive metals. One example of such a reactive metal is titanium. Titanium reacts readily with oxygen to form oxygen-enriched titanium, which reduces the quality of articles cast from titanium. Titanium normally reacts with materials used to form the mold, such as oxides, thereby releasing oxygen and forming oxygen-enriched titanium.

Attempts to make a pH-stable, non-toxic yttria/colloidal-silica slurry have been unsuccessful ("slurry" is defined as a liquid dispersion of particles). Hence, such slurries are commercially impractical. For instance, Lassow's U.S. Pat. No. 4,703,806 states that a mold facecoat comprising yttria powder and aqueous colloidal silica produces a slurry which gels prematurely. Facecoats made from such slurries tend to crack during firing.

Colloidal silica is a widely used binder for casting molds. The colloidal silica ($SiO_2$) usually used on a commercial basis have a silica content of approximately 30 percent, and are stabilized by an alkali (usually sodium oxide). Colloidal silicas are widely used as casting mold binders because the silicas are relatively inexpensive, stable, possess excellent room-temperature bonding characteristics, are not flammable, and do not require the use of organic solvents.

Such colloidal silicas have an optimum pH of less than ten, particularly about 9–10. A higher pH is unfavorable for maintaining $SiO_2$ in a colloidal suspension. If the pH of a colloidal slurry made using $SiO_2$ is greater than about 9–10, then the silica particles aggregate, and the lifetime of the slurry substantially decreases. Another consequence of silica particle aggregation is increased slurry viscosity. Increased slurry viscosity decreases the ability of the slurry to flow and drain from the mold after it is immersed into the slurry. The result is an irregular distribution of slurry on the surface of the mold. For these reasons, the viscosity of the slurry must be maintained within a certain acceptable range. Maintaining a proper pH is important for maintaining an appropriate slurry viscosity.

Horton's U.S. Pat. No. 4,947,927 (Horton) addresses some of the problems associated with yttria slurries. Horton states that an aqueous yttria slurry having a colloidal silica binder and a source of hydroxyl ion does not gel prematurely, as long as the slurry has a pH of at least 10.2, and preferably about 11.0. Horton specifically states that a slurry having an $SiO_2/NaO_2$ equivalent dry weight ratio of 30-to-1 had a pH of less than 10.2 after six days experienced premature gelation to the extent that it settled and could not be redispersed. Due to their premature gelation tendencies, these slurries with a pH of less than 10.2 were all unsatisfactory for use in forming molds and/or cores. Horton, column 10, lines 48–54.

Horton also teaches using an organic base, in combination with the remaining ingredients of the yttria slurry, as the source of hydroxyl ion. Hydroxyl ions apparently are necessary to stabilize the yttria slurry in Horton's method. It is the pH of the solution, as well as the nature of the source of hydroxyl ions, that is important. With inorganic bases, the rate of silica dissolution is unacceptably high. Horton specifically teaches using an organic base, such as tetraethylammonium hydroxide, as the source of hydroxyl ions. A bulky organic base, such as tetraethylammonium hydroxide, helps prevent the dissolution of silica as the pH increases in Horton's patent.

Although yttria slurries have been recognized as being desirable for forming molds useful for casting reactive metals, yttria-zirconia slurries have not been considered for such slurries. Zirconia is more reactive with molten titanium than yttria. Compositions having about 95-percent zirconia are commercially available wherein the remaining 5 percent of the composition comprises yttria, alumina and other materials. Although such mixtures of zirconia and yttria are commercially available, they previously have not been used in the refractory industry.

In summary, the prior art teaches that slurries of yttria and colloidal silica are impractical, if not impossible, to produce. Horton teaches that yttria slurries may be produced if the pH of the slurry is maintained at a pH of greater than about 10.2. Moreover, a slurry at a pH of 11 is toxic, and therefore presents an environmental and health hazard. Finally, most commercially available colloidal-silica solutions, which typically are used in combination with other ingredients to form yttria slurries, have a pH in the range of about 9–10. Thus, it is preferable if the pH of a stable yttria slurry also was about 9–10.

SUMMARY OF THE INVENTION

The present invention provides a pH-stable, nontoxic yttria-based slurry that is useful for forming mold facecoats. The slurry is particularly suitable for making molds useful for casting reactive metals. The slurry comprises an aqueous slurry of a fused yttria-zirconia material. Slurry compositions according to the present invention provide comparable-quality titanium casting when compared to a titanium casting made from a mold comprising substantially pure yttria flours. Zirconia is not as good a refractory as yttria, yet the fused yttria-zirconia material is a good refractory. Furthermore, the pot life of slurries can be extended by using fused yttria-zirconia slurries.

The compositions of the present invention comprise an aqueous slurry of an inorganic binder, such as colloidal silica, and fused yttria-zirconia. Fused yttria-zirconia flours suitable for the present invention may be specially ordered from a number of sources. Alternatively, the fused material may be made by first forming a desired weight mixture of a source of zirconia and a source of yttria, such as zirconium oxide and yttrium oxide. This mixture is heated until molten, such as up to about 2000° C., and then cooled to produce the fused flour. The fused yttria-zirconia has from about 0.1 weight percent to about 20.0 weight percent zirconia, more preferably from about 1.0 weight percent to about 10.0 weight percent zirconia, and even more preferably from about 5 to about 7.5 weight percent zirconia. The fused flour is crushed into small particles having an average particle size of from about 10 μm to about 15 μm.

An aqueous slurry is formed using these fused-flour particles. The slurry may include from about 20-weight percent to about 90-weight percent fused yttria-zirconia, more preferably from about 75-weight percent to about 85-weight percent fused yttria-zirconia. The composition may further comprise a material selected from the group consisting of an inorganic binder, an organic binder, a surfactant, an antifoaming agent, and mixtures thereof. The inorganic binder preferably is colloidal silica, the organic binder preferably is latex with an anionic or nonionic charge and which forms a film upon drying at a temperature of less than about 70° F., the surfactant preferably is a sodium dioctyl sulfosuccinate having a molecular weight of about 444, and the antifoaming agent preferably is a water-dilutable active silicone defoamer. When the inorganic binder is silica, then the ratio of yttria-zirconia to silica typically is from about 6.5 to about 20.5, preferably from about 10.0 to about 10.5, and even more preferably is about 10.2. The pH of the slurry typically is from about 9 to about 10.

The present invention also provides a method for casting a reactive metal using the slurry composition. The method comprises first providing fused yttria-zirconia having from about 0.1 weight percent to about 20.0 weight percent zirconia. An aqueous facecoat slurry according to the present invention then is formed using the fused yttria-zirconia. The slurry viscosity typically is adjusted to be preferably about 350 to about 500 centipoise at 0.1 s$^{-1}$. A pattern, such as a wax pattern formed in the shape of a desired device, then is immersed into the facecoat slurry. The pattern is withdrawn, and the excess slurry is allowed to drain from the pattern to form a uniform facecoating. The slurry-coated pattern then is coated with a fine granular stucco refractory. After a period of time to dry the facecoat, a monolithic mold is built by repeating the above steps using either the same slurry, or preferably other aqueous or nonaqueous slurries, until a sufficient thickness is obtained. A sufficient thickness depends on the end-use of the mold. The wax pattern then is removed. The mold is fired at a temperature of about 2000° F., and then is allowed to cool to a temperature of about 1600° F. The mold thereafter is engaged with or filled with a reactive metal, such as titanium, during a casting process.

The method may further comprise initially forming a large body of an aqueous slurry containing from about 20 weight percent to about 90 weight percent, and preferably from about 75 weight percent to about 85 weight percent, fused yttria-zirconia material and an inorganic binder, such as silica. The viscosity of the slurry typically is adjusted to a value of from about 350 centipoise to about 500 centipoise at 0.1 s$^{-1}$. A plurality of patterns are sequentially formed and immersed in the slurry to form a plurality of molds so that each mold has surface layers comprising the slurries. The surface layers formed from the slurry are thereafter engaged with a reactive metal. In a preferred embodiment, the pattern defines a cavity for receiving molten titanium. In the preferred embodiment, only the cavity is contacted with the molten titanium.

Finally, the present invention also includes metal products cast according to the method of the present invention.

Slurries made according to the present invention are less sensitive to pH fluctuations than are slurries made from yttria flour (referred to herein as yttria slurries). Moreover, slurries made using the fused flours of the present invention do not gel prematurely, and exhibit substantially the same formation of oxygen-enriched titanium (alpha case) as do yttria slurries.

An object of the present invention is to provide a yttria-zirconia slurry that is more pH stable than previous yttria-based slurries.

Another object of the present invention is to provide a stable yttria-zirconia slurry that results in a substantially similar alpha case relative to previous yttria-based slurries.

Another object of the present invention is to provide a yttria-zirconia slurry that is less toxic than previous yttria-based slurry compositions.

Another object of the present invention is to provide a method for forming a mold facecoat using yttria-zirconia slurries wherein the molds alleviate many of the problems associated with casting reactive metals.

A first feature of this invention is a fused yttria-zirconia material that is more stable as an aqueous colloidal slurry than previous yttria-based slurries at environmentally acceptable pH.

A second feature of the present invention is a colloidal slurry comprising a fused yttria-zirconia material, an inorganic binder, an organic binder, a surfactant and an antifoaming agent.

An advantage of the present invention is that yttria-zirconia slurries according to this invention are more pH stable and less toxic than previous yttria-based slurries.

A second advantage of this invention is that the yttria-zirconia slurries exhibit substantially the same alpha case as previous yttria-based slurries.

DETAILED DESCRIPTION OF THE PREFERRED EMBODIMENTS

Figure 1:
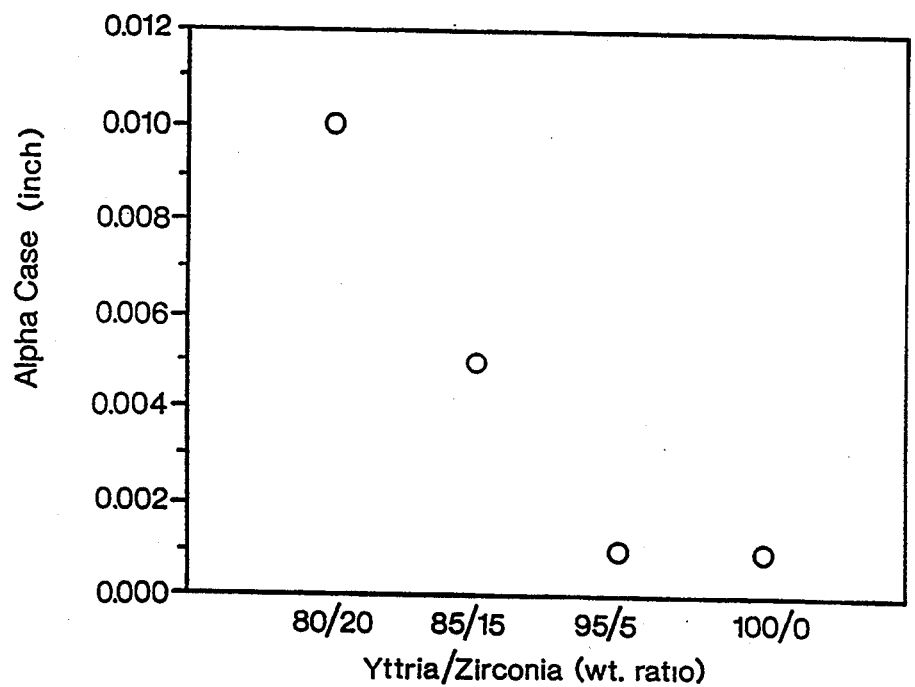
FIG. 1 is a graph of the weight composition of a fused flour according to the present invention relative to percent alpha case.

The present invention is directed to an aqueous ceramic slurry containing fused yttria-zirconia and an inorganic binder, such as colloidal silica. "Fused" yttria-zirconia as used herein refers to a material formed from a mixture of a source of yttria and a source of zirconia. The mixture is heated above the melting points of both materials, and the molten material is cooled to room temperature. The resulting material is referred to herein as fused yttria-zirconia, yttria-zirconia flours or fused flours. Pure yttria typically is referred to herein as yttria flour. Without limiting the invention to one theory of operation, it is believed that the fused flour has zirconia ions on the surface of $Y_2O_3$, that occupy water-dissolution sites. The fused yttria-zirconia may have from about 0.1 weight percent to about 20 weight percent zirconia, more preferably from about 1 weight percent to about 10 weight percent zirconia, and even more preferably from about 5 weight percent to about 8 weight percent zirconia, relative to yttria and zirconia starting materials.

Slurries according to the present invention may include other materials in addition to fused yttria-zirconia and an inorganic binder such as colloidal silica. For instance, the slurry may further comprise any one or a combination of an inorganic binder, such as colloidal silica, fine titanium-dioxide particles, an organic binder, such as a latex, a surfactant and an antifoaming agent.

I. Yttria-Zirconia Slurries

A. Fused Flour

The following paragraphs describe a general procedure for making fused flour. However, suitable fused flours are commercially available from a number of sources. Particularly suitable fused flours for the present invention were specially ordered from the Treibacher Company of Althofen, Austria.

The fused flour may be produced by forming a particular weight composition of a source of yttria and a source of zirconia. One skilled in the art will realize that the source of yttria or zirconia may vary as long as the material chosen does not interfere with the formation, stability and end-product characteristics of the slurry. Yttrium oxide ($Y_2O_3$) and zirconium oxide ($ZrO_2$) presently are particularly suitable sources of yttria and zirconia. These materials can be purchased commercially from any of a number of sources such as the Aldrich Chemical Company of Milwaukee, Wis. The mixture of a source of zirconia and yttria is heated until molten, such as up to about 2000° C. The molten mixture then is slowly cooled to ambient temperature. The fused material obtained by this process is crushed into small particles having a particle size of from about 10 $\mu$m to about 20 $\mu$m, more preferably about 15 $\mu$m.

The weight percent of zirconia in the fused flour may vary. One skilled in the art will realize that the amount of zirconia in the slurry primarily will be determined by the desired characteristics for facecoats made from these slurries. As discussed in more detail below, the weight percent of zirconia, based on the initial weight percent of zirconia and yttria starting materials, should be less than about 20 weight percent. More specifically, the weight percent of zirconia is preferably from about 0.1 weight percent to about 20.0 weight percent, more preferably greater than about 5 percent but less than about 10 percent, and even more preferably from about 5 percent to about 7.5 percent, based on the weights of the starting materials. A presently preferred amount of zirconia is about 5 weight percent. Weight percents of zirconia greater than those described herein apparently reduce the non-reactivity associated with yttria.

Yttrium oxide exists as a cubic crystal structure. The fused material also is a cubic crystalline structure having a uniform distribution of zirconium and yttrium ions. Yttria's aqueous solubility is pH dependent, as is the solubility of silica, which often is used as an inorganic binder for ceramic slurries. As yttria dissolves, or if the pH of the slurry fluctuates causing either yttria or silica dissolution, the slurry viscosity increases. This in turn causes the slurry to age until it is no longer usable. A stable slurry depends upon forming an environment that is suitable in terms of both yttria dissolution and silica dissolution. Without limiting the invention to one theory of operation, zirconia is less water soluble than is yttria and decreases the solubility of the fused yttria-zirconia material relative to the solubility of yttria particles.

B. Inorganic Binder

The aqueous yttria-zirconia slurry includes an inorganic binder, such as colloidal silica ($SiO_2$). One skilled in the art will realize that the inorganic binder can be varied to be other than silica. For instance, the inorganic binder might comprise an alumina compound. However, it presently is preferred to use a commercially available colloidal silica or polysilicate as the inorganic binder.

Commercially available silicas typically comprise an aqueous, alkaline-stabilized solution containing up to about 50 percent silica. A number of suitable, commercially available colloidal silicas are described at column 4 of Horton's U.S. Pat. No. 4,947,927, which patent is herein incorporated by reference in its entirety. Table 1 below lists a number of colloidal silicas that are particularly suitable as inorganic binders for the present invention. Water may be added to these inorganic binders to reduce the aqueous silica concentration.

TABLE 1

COMMERCIAL COLLOIDAL SILICAS (AND POLYSILICATES)

| Grade | Particle Size | % $SiO_2$ | Stabilizing Ion Type | % | Other | pH | Weight Ratio $SiO_2$/Alkali |
|---|---|---|---|---|---|---|---|
| Dupont Ludox HS-40 | 12 | 40 | $Na_2O$ | 0.41 | — | 9.7 | 95 |
| Dupont Ludox HS-30 | 12 | 30 | $Na_2O$ | 0.32 | — | 9.8 | 95 |
| Dupont Ludox TM | 22 | 50 | $Na_2O$ | 0.21 | — | 9.1 | 220 |
| Dupont Ludox SM | 7 | 30 | $Na_2O$ | 0.56 | — | 10.0 | 50 |
| Dupont Ludox AM | 12 | 30 | $Na_2O$ | 0.24 | Surface aluminate ions | 8.8 | 125 |
| Dupont Ludox AS | 22 | 50 | $NH_3$ | 0.16 | 0.08 $Na_2O$ | 9.1 | 270 |
| Dupont Ludox LS | 22 | 30 | $Na_2O$ | 0.10 | — | 8.1 | 280 |
| Dupont Ludox CL-X | 22 | 46 | $Na_2O$ | 0.19 | — | 9.2 | 230 |
| Dupont Polysilicate 48 | | 20 | $LiO_2$ | 2.1 | — | 11 | 10/1 |
| Dupont Polysilicate 85 | | 20 | $LiO_2$ | 1.2 | — | 11 | 17/1 |
| Nyacol 215 | 3–4 | 15 | $Na_2O$ | 0.83 | — | 11 | 18/1 |
| Nyacol 830 | 8 | 30 | $Na_2O$ | 0.55 | — | 10.5 | 56 |
| Nyacol 1430 | 14 | 30 | $Na_2O$ | 0.40 | — | 10.3 | 75 |
| Nyacol 1440 | 14 | 40 | $Na_2O$ | 0.48 | — | 10.4 | 83 |
| Nyacol 2050 | 20 | 50 | $Na_2O$ | 0.47 | — | 10 | 106 |
| Nyacol 2050 | 20 | 40 | $Na_2O$ | 0.38 | — | 10 | 105 |
| Nyacol 5050 | 50 | 50 | $Na_2O$ | 0.15 | — | 9.3 | 333 |

TABLE 1-continued

COMMERCIAL COLLOIDAL SILICAS (AND POLYSILICATES)

| Grade | Particle Size | % SiO$_2$ | Stabilizing Ion Type | % | Other | pH | Weight Ratio SiO$_2$/Alkali |
| --- | --- | --- | --- | --- | --- | --- | --- |
| Nyacol 9950 | 100 | 50 | Na$_2$O | 0.12 | — | 9.0 | 417 |
| Nyacol 2040 NH$_4$ | 20 | 40 | NH$_3$ | 0.2 | — | 9.0 | 200 |
| Nyacol 2046 EC | 20 | 46 | Na$_2$O | 0.42 | — | 10 | 110 |
| Nalcoag 1130 | 8 | 30 | Na$_2$O | 0.70 | — | 10 | 43 |
| Nalcoag 1030 | 11–16 | 30 | Na$_2$O | | | 10.2 | |

A presently preferred inorganic binder is a colloidal silica produced by the DuPont Chemical Company. DuPont sells this material as Dupont Ludox SM. Ludox SM has a silica concentration of about 30 weight percent, a pH of approximately 10.0, and a particle size of approximately 7 nm. Sodium oxide, at about 0.56 weight percent, also is added as a stabilizing ion.

The amount of colloidal silica added to the slurry may vary. Presently, a preferred amount of colloidal silica in the slurry is from about 5 weight percent to about 15 weight percent, and even more preferably from about 7.5 weight percent to about 10 weight percent. A presently preferred amount of colloidal silica is about 7.9 weight percent.

C. Organic Binder

An organic binder may be added to slurries of the present invention in combination with the inorganic binders, particularly colloidal silica binders, discussed above. Particularly suitable organic binders are latex binders. One consideration for selecting a latex binder is the extent to which residual, latex-derived combustion products remain after heat treating the end product. The latex binder preferably substantially completely burns off so that little or no residual latex combustion products are left on the finished product. The film-forming temperature and the charge associated with the latex binder also may be important. Preferably, the latex binder should have an anionic or nonionic charge and should form a continuous film at ambient temperatures, such as a temperature of less than about 70° F. Particularly suitable latexes for this invention are provided by the Dow Chemical Company. A presently preferred latex binder is Dow Latex 460NA, which is a non-ionic styrene-butadiene polymer having a film-forming temperature of less than about 4° C. and a pH of about 10.5.

The amount of organic binder added to the slurry may vary, primarily because the binder eventually is burned off during the final heat treatment. Ceramic molds according to the present invention are heat treated to a temperature of about 2000° F. At such temperatures virtually all organic binder substances are thoroughly combusted. However, a presently preferred amount of latex is typically less than about 15 percent. An even more preferred amount of latex binder presently is from about 1 to about 10 weight percent, and even more preferably about 5 weight percent.

D. Surfactant

A surfactant also may be added to slurries according to the present invention. One reason for adding a surfactant is to reduce the surface tension of the slurry. The surfactant enables wax patterns, typically used in the formation of ceramics, to be wetted by the slurry. To form a mold facecoat, a wax pattern is dipped into the slurry to wet the pattern with a thin, uniform slurry layer. However, the surface tension of water is about 73 dynes/cm, whereas a typical surface tension for wax is about 25 dynes/cm. Because the surface tension of water is greater than the wax, the wax pattern will not be sufficiently wetted by the slurry. A surfactant therefore may be added to slurries of the present invention to reduce the surface tension of the slurry to less than about 25 dynes/cm, or less than about the surface tension of the wax used to form the pattern.

Presently preferred surfactants are therefore capable of reducing the slurry's surface tension to less than about 25 dynes/cm. Furthermore, preferred surfactants are substantially non-ionic or anionic at the pH selected for the slurry (about 8–10). Particularly suitable surfactants for the present invention are Aerosol OT surfactants available from American Cyanamid Company of N.J. The Aerosol OT surfactants are anionic sodium dioctyl sulfosuccinate compounds having a molecular weight of about 444. Presently, a preferred surfactant from the American Cyanamid Company is Aerosol OT-75. This surfactant is a clear, slightly viscous liquid having a specific gravity of 1.09 at 25° C., a flash point of about 105° F., and a freezing point of about −45° C. The pH of a 1 percent solution of Aerosol OT-75 surfactant is about 5–7.

One skilled in the art will realize that the amount of surfactant added to the fused slurries of the present invention may vary. However, a presently suitable amount of surfactant for addition to the fused slurries, based on weight percent, is from about 0.1 weight percent to about 1.0 weight percent. A presently preferred amount of surfactant is about 0.2 weight percent.

E. Antifoaming Agent

The slurry also may include an antifoaming agent. The addition of a surfactant to the slurry enhances the formation of bubbles. Hence, an antifoaming agent also may be added to substantially reduce the occurrence of, or substantially eliminate, the formation of bubbles. One skilled in the art will realize that any suitable defoamer may be used for the present invention. However, a particularly suitable antifoaming agent for the present invention is available from the Dow Corning Corporation under the product designation Dow-Corning Additive 65. This product is a 10 percent, water-dilutable active silicone defoamer having a pH of approximately 7.0.

As with the other components of the slurry, the amount of an antifoaming agent added to the slurry may vary. Presently, a particularly suitable amount of an antifoaming agent is from about 0.1 weight percent to about 1.0 weight percent. A presently preferred amount of an antifoaming agent for addition to the fused slurries is about 0.1 weight percent.

F. Titanium Dioxide

Titanium dioxide often is added to slurries according to the present invention to improve the strength of articles, such as molds, that are made from the slurry.

Titanium dioxide is available commercially from a number of sources, including the DuPont Chemical Company and the Aldrich Chemical Company. Suitable titanium dioxide for the present invention was purchased from DuPont as R900 titanium dioxide, which has a titanium dioxide purity of greater than about 94 percent. However, any titanium dioxide suspension that has substantially similar properties to R900 titanium dioxide will be suitable for the present invention. More specifically, a dilute (less than $10^{-2}$ volume percent) suspension of a suitable titanium dioxide, such as R900 titanium dioxide, will, at a pH of about 10.5, have a zeta potential of about $-27$ mV and an average particle size of about 274 nm. This does not mean that the titanium dioxide must be used at such dilute concentrations; rather, titanium dioxide suspensions suitable for this invention, having the characteristics stated above, will be suitable for this invention.

One skilled in the art will realize that the amount of titanium dioxide added to the slurries made using fused flours may vary. However, titanium dioxide typically is added to slurries according to the present invention at from about 0.1 to about 5.0 weight percent, more preferably from about 1.0 to about 4.5 weight percent, and even more preferably about 4 weight percent.

G. Slurry Viscosity

The viscosity of the slurry typically is adjusted, by increasing or decreasing the water content, each time a new slurry is produced. A slurry viscosity suitable for the present invention is from about 400 centipoise to about 600 centipoise at $0.1 \text{ s}^{-1}$, and even more preferably from about 450 to about 550 centipoise. A presently preferred viscosity for the fused slurries of the present invention is about 500 centipoise.

II. Examples

The following Examples are provided to further describe the present invention. Example 1 teaches how a particular fused slurry according to the present invention was made. Example 2 teaches how a fused slurry was made having titanium dioxide added for extra strength. Example 3 describes the formation of a mold using the slurry of Example 2 as its facecoat. These Examples are meant to be exemplary only, and are in no way intended to limit the scope of the invention.

EXAMPLE 1

A fused flour (95 percent yttrium and 5 percent zirconia) was specially ordered from the Treibacher Company. The fused flour was added to deionized water with stirring, using a high-shear mixer at 3000 rpm, to form a suspension. The weight percent of the fused flour in the suspension was about 80 weight percent. However, this weight percent may vary from about 20 weight percent to about 90 weight percent, and preferably is about 75 weight percent to about 85 weight percent. Thereafter, latex (Dow 460 NA), surfactant (Aerosol OT), antifoaming agent (Dow Corning 65 Additive) and colloidal silica (Ludox SM) were added to the slurry with continued stirring. A slurry made according to this Example 1 have a pH of about 9.75.

The relative weight percent of each material in the resulting slurry is shown below in Table 2. As can be determined from Table 2, the ratio of fused yttria-zirconia to silica is 10.73 for Example 1. However, this ratio may vary, and typically is from about 6.5 to about 20.5, and preferably is from about 10 to about 11, even more preferably is about 10.2.

TABLE 2

| Material | Weight Percent |
| --- | --- |
| deionized water | 5.1 |
| latex (Dow 460NA) | 1.9 |
| surfactant (Aerosol OT) | 0.2 |
| colloidal silica (Ludox SM) | 7.9 |
| fused flour (5% zirconia) | 84.8 |
| defoamer (Dow Corning 65 Additive) | 0.1 |

EXAMPLE 2

A fused flour (95 percent yttrium and 5 percent zirconia) was specially ordered from the Treibacher Company. The fused flour was added to deionized water with stirring, again using a high-shear mixer at about 3000 rpm, to form a suspension. The weight percent of the fused flour in the suspension was about 80 weight percent. Thereafter, titanium dioxide, latex (Dow 460 NA), surfactant (Aerosol OT), Dow Corning 65 Additive antifoaming agent and colloidal silica (Ludox SM) were added, in that order, to the slurry with continued stirring. The relative weight percent of each material in the slurry is shown below in Table 3.

TABLE 3

| Material | Weight Percent |
| --- | --- |
| deionized water | 5.1 |
| titanium dioxide (Dupont R900) | 4.0 |
| latex (Dow 460NA) | 1.9 |
| surfactant (Aerosol OT) | 0.2 |
| colloidal silica (Ludox SM) | 7.9 |
| fused flour (5% zirconia) | 80.8 |
| defoamer (Dow Corning Additive 65) | 0.1 |

EXAMPLE 3

A wax step-wedge pattern was formed for casting titanium. A facecoat layer was made by immersing a wax step-wedge pattern into the yttria-zirconia slurries of the present invention. The wax pattern was removed from the slurry and excess material was allowed to drain from the wax pattern to obtain a uniform coating. Subsequently, the slurry-coated wax pattern was covered with 70 mesh alumina stucco and allowed to dry for twelve hours in an environment of about 70° F. at a relative humidity of about 52 percent. After twelve hours, the slurry-coated wax pattern was coated with an intermediate slurry consisting of $-325$ mesh alumina flour and 70 mesh alumina stucco in an ethyl silicate solution. The pattern was allowed to drain and it then was covered with 46 mesh stucco and allowed to dry. Eight subsequent coatings were applied in a like manner. After nine total coats, the slurry composition was changed to a slurry consisting of $-325$ mesh zircon flour and 70 mesh alumina stucco in an aqueous, colloidal silica slurry. This slurry was applied, the slurry-coated pattern was allowed to drain, and the pattern thereafter was covered with 46 mesh alumina stucco. This slurry/stucco combination was applied as twelve separate coats in this Example, although the number of coatings may vary from about twelve to about twenty-four total coatings. A final seal-dip coating was applied; however, no stucco was applied after draining.

After the shell was formed as described above, the wax pattern coated with the ceramic shell was placed in an autoclave. The temperature inside the autoclave was increased rapidly to a final temperature of about 350° F. This softened the wax, which was allowed to drain to leave a ceramic shell. This shell was fired to about 2000° F.

After the firing process, the mold may be engaged with a reactive metal during a metal casting process. This often is done by first heating the mold to about 1600° F. before the mold is engaged with a molten metal. This initial heating step may not be necessary for every casting job, although preheating the mold to a temperature of about 1600° F. is a presently preferred casting method. As used herein, the term "engaged" means any method whereby a reactive metal is brought into contact with a ceramic mold made according to the present invention. Hence, without limitation, "engaged" may mean filling a mold with a reactive metal, or immersing the mold into a molten metal so that the surface of the mold is contacted by the molten metal.

III. Reduced Alpha Case

One purpose of the present invention is to provide a slurry that reduces the reaction of reactive metals, such as titanium, with a mold having a yttria-zirconia facecoat. Titanium is quite reactive and reacts with oxygen to form oxygen-enriched titanium, which reduces the desirable characteristics of products cast from titanium. The formation of oxygen-enriched titanium is referred to by those of skill in the art as alpha case, and is a well-documented problem associated with titanium casting. It is preferable if the alpha case is substantially zero, although this is rarely, if ever, achieved. When a cast workpiece exhibits alpha case, the workpiece must be etched to remove the oxygen-enriched titanium. Alpha case depends upon a number of factors including the thickness of the cast titanium device. However, without limitation, alpha case in an initially cast Ti-6-4 workpiece (a titanium-alloy workpiece having 90% titanium, 6% aluminum and 4% vanadium) workpiece is from about 0.0 to about 0.01 inch for pure yttria slurries when casting a titanium device having a thickness of less than about 3 inches. An alpha case of about 0.01 inch still requires that the workpiece be etched in order to remove the oxygen-enriched titanium from the cast workpiece. As used herein, the term "workpiece" refers to any desired device that may be cast out of a reactive metal. Some specific examples of workpieces, without limitation, include turbochargers, fan frames and blades, and cast metal parts on airplanes. However, one skilled in the art will realize that the term "workpiece" may refer to any cast metal device, part or structure.

FIG. 1 is a graph of the weight composition of yttria and zirconia in separate fused-flour formulations relative to the alpha case produced by such compositions. The slurry used to obtain the data of FIG. 1 was made as stated above for Example 1 simply by varying the percent zirconia in the fused flour. The data shown in FIG. 1 is derived from at least 2 castings at each data point from position 4 of a step-wedge casting. Position 4 of a step-wedge casting has a thickness of about 0.25 inch. The step-wedge casting was performed by first heating a step-wedge mold to a temperature of about 1600° F. before pouring molten titanium into the mold. FIG. 1 compares a yttria slurry, which is preferable from the viewpoint of reducing the reactivity of facecoats, to a fused yttria-zirconia slurry. However, a yttria slurry is unstable if the pH of the slurry is between 9-10 where fused slurries are made. Hence, the alpha case that occurs with a yttria slurry having a pH of about 11.5 was used as a standard for measuring the reactivity of fused slurries made according to the present invention.

FIG. 1 shows that a slurry made using fused flour comprising 95 percent yttria and 5 percent zirconia had an alpha-case level substantially equal to that of the yttria slurry. This also is true for a slurry comprising a fused flour having about 92.5 percent yttria and 7.5 percent zirconia. Moreover, a slurry comprising a fused flour having about 7.5 percent zirconia has reduced sensitivity to pH fluctuation, and can be stable for a period of several months at a pH below about 10. Hence, a preferred range of zirconia for producing fused flours according to the present invention is approximately 0.1 percent to about 8.0 percent. More preferably, the fused flour should contain approximately 5 percent to about 7.5 percent zirconia.

As stated above, the alpha case that occurs in casting titanium depends, at least in part, upon the thickness of the cast titanium. Table 4 below compares the alpha case that occurs when a Ti-6-4 step-wedge casting was made using patterns having facecoats formed from a 100-percent yttria slurry or a slurry made using a fused flour containing 95-percent yttria and 5-percent zirconia. The slurries used to obtain the data for Table 4 were made as stated above for Example 1. The data shown in Table 4 is derived from at least two castings at each position of the step-wedge casting made having thicknesses of from about 0.125 inch to about 1.5 inches. The addition of 5-percent zirconia to the fused flour helps stabilize slurries made from such fused flour against pH fluctuation; however, Table 4 clearly shows that there is no increase in the alpha case that occurs with a fused flour having 95-percent yttria and 5-percent zirconia relative to a slurry made using 100 percent yttria.

TABLE 4

| Step Wedge Casting of Ti-6-4 | | |
|---|---|---|
| Metal Cast | Alpha Case, Inch | |
| Thickness (Inch) | 100/0 | 95/5 |
| 1.5 | 0.008 | 0.008 |
| 1.0 | 0.004 | 0.004 |
| 0.25 | 0.001 | 0.001 |
| 0.125 | 0.001 | 0.001 |

IV. Slurry Stability

Figure 2:
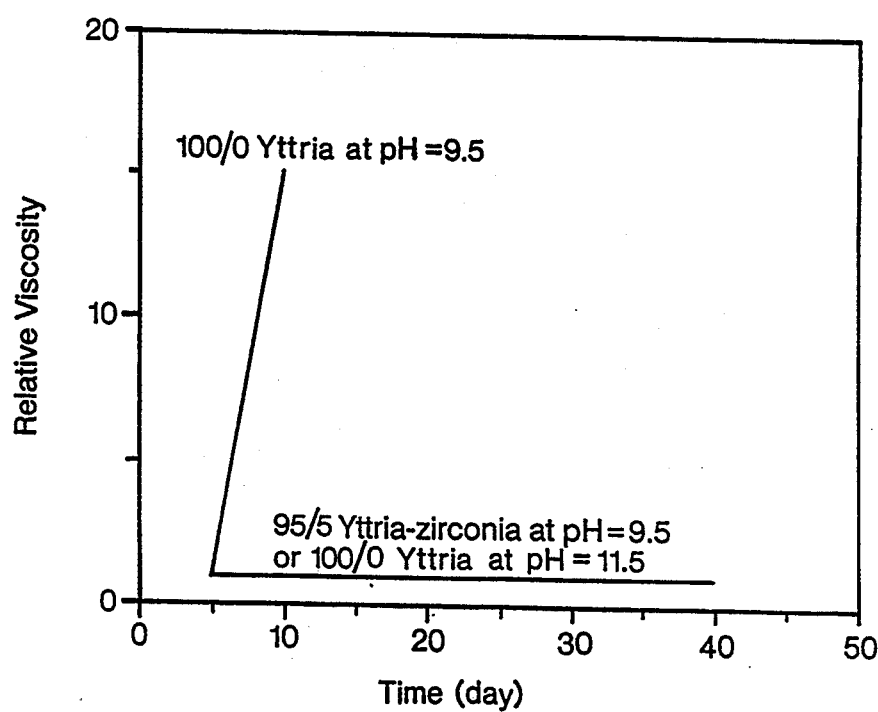
FIG. 2 is a graph of time (days) versus relative viscosity that compares the aging of a yttria slurry to a yttria-zirconia slurry according to the present invention.

FIG. 2 shows the relative stability of a yttria slurry versus a fused slurry as measured by the relative viscosity increase as a function of time. If the viscosity of the slurry is too great, the slurry layer deposited on the mold is to thick. Moreover, the slurry will not drain properly, and therefore will not form a uniform slurry coating on the mold. As stated in the Background of the Invention, the yttria slurry is highly pH sensitive. The stability of a yttria slurry depends upon it having a pH of greater than about 9-10, which is the pH range at which slurries normally are made, and preferably greater than about 11. The slurry referred to in FIG. 2 as standard is a yttria slurry at a pH of approximately 11.5.

FIG. 2 shows that a fused (95 percent yttria-5 percent zirconia) slurry, at a pH of approximately 9.5, ages at a much slower rate than the yttria slurry does at a pH of 9.5. As can be seen in FIG. 2, the viscosity of the yttria slurry quickly increases to unacceptable levels, while the stability of the fused slurry remains substantially constant. Moreover, the fused slurry has an aging rate that is at least about as good as the yttria slurry at a higher pH of 11.5. The viscosities of yttria slurries at pH 11.5 and fused slurries according to the present invention did not increase even after a period of about 60 days. However, slurries at a pH of about 9.5 gel in less than about a week, and this instability limits the use of yttria slurries at this pH when the slurries are prepared in large quantities on an industrial scale.

Figure 3:
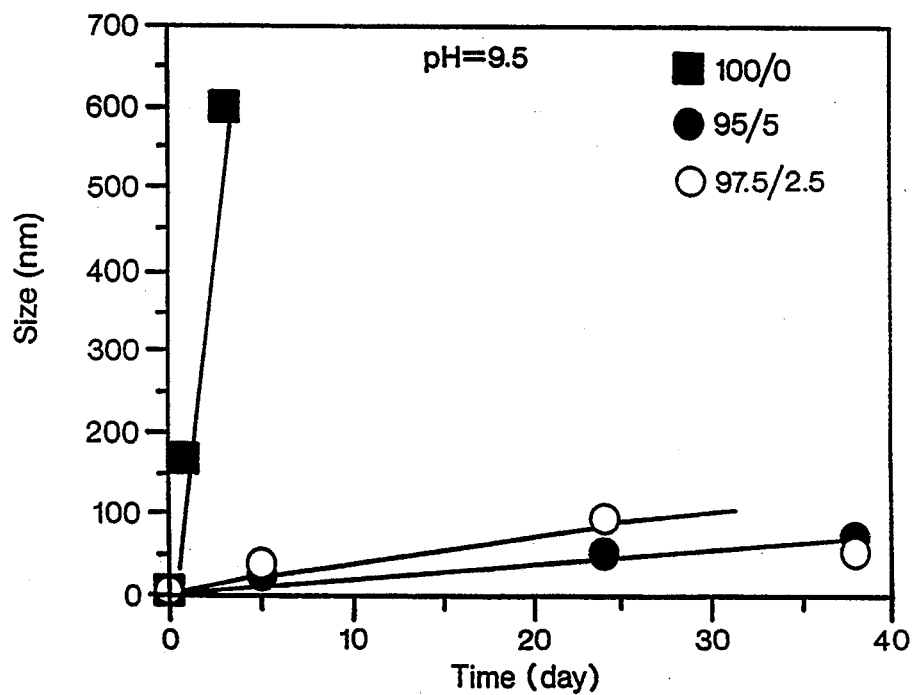
FIG. 3 is a graph of time (days) versus particle size that compares the coarsening of extracted silica from a yttria slurry to the coarsening of extracted silica from yttria-zirconia slurries of the present invention.

FIG. 3 of this application also shows the gelation tendencies of yttria and fused yttria-zirconia slurries. FIG. 3, which provides additional support for the viscosity data of FIG. 2, shows the measurement of the size of extracted colloidal silica from yttria and fused slurries versus time. The data portrayed in FIG. 3 was obtained by first forming a fused yttria-zirconia slurry according to the present invention, as well as a yttria slurry at a pH of about 9.5. Colloidal silica was extracted from each of these slurries by centrifuging an amount of each slurry at about 2000 rpm for a period of about 2 hours. Thereafter, the colloidal silica supernatant was studied by light-scattering techniques in order to determine the average particle size. Increased particle size correlates with an increased slurry aging rate. In accordance with FIG. 2, the silica extracted from a yttria slurry at a pH of 9.5 coarsened very rapidly. The yttria slurry gels as a result of this coarsening. On the other hand, FIG. 3 shows that the colloidal silica extracted from the fused slurries does not coarsen as rapidly. Therefore, fused yttria-zirconia slurries are more stable and do not gel as rapidly as do yttria slurries at a pH of 9.5.

Based on the data presented in both FIGS. 2 and 3, the yttria slurry is very pH sensitive. If the pH drops, then the yttria slurry will age very rapidly. Fused slurries are not as sensitive as yttria slurries to variations in pH. A pH drift of more than one unit, specifically from about pH 9.5 to slightly over pH 8, has occurred with the fused slurries and no observed viscosity change has occurred. A similar drift in the pH of the yttria slurry, however, will cause rapid gelation. Such pH drifts are not uncommon in industrial slurries. For instance, the slurry may absorb $CO_2$, which causes a dramatic decrease in the pH, thus also resulting in premature yttria slurry gelation.

V. Increased Strength by Addition of Titanium Dioxide and/or Organic Binder

Figure 4:
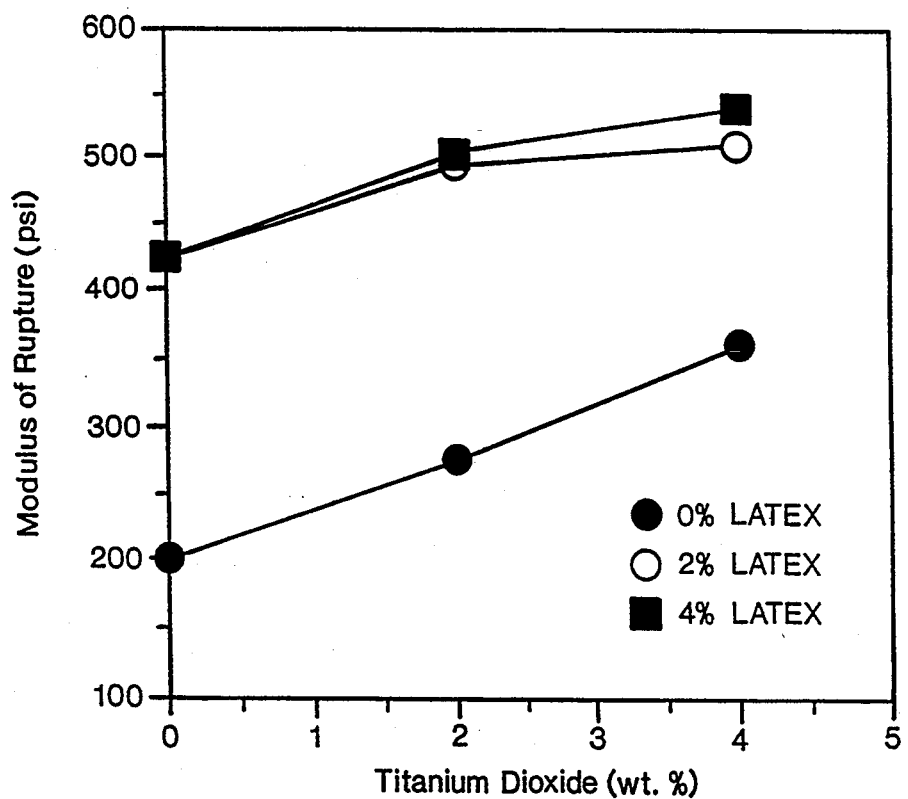
FIG. 4 is a graph of percent titanium dioxide versus modulus of rupture (psi).

FIG. 4 shows the desirability of adding certain weight percents of titanium dioxide to slurries according to the present invention. The data for the graph of FIG. 4 was obtained by using the slurry of Example 2 and varying the percent of titanium dioxide added to the slurry. Products made from the slurry then were exposed to modulus of rupture tests. Titanium dioxide increased the green (unfired) strength of molds made from such slurries. Hence, the data presented in FIG. 4 shows that the three-point bend modulus of rupture, as measured in pounds per square inch, increased as the weight percent of titanium dioxide increased from about 0 weight percent to about 4 weight percent. Thus, adding small amounts of titanium dioxide to the fused slurries of the present invention increased the strength of molds made from such slurries.

FIG. 4 also shows the desirability of adding an organic binder, such as a latex binder, to the fused slurries of the present invention. Where no latex binder and no titanium dioxide were added to the slurry, the modulus of rupture for products made from the slurry was about 200. This value increased up to about 360 after the addition of about 4 weight percent titanium dioxide. The addition of 2 weight-percent latex to the slurry increased the modulus of rupture from about 200, wherein the fused slurry had no added organic binder, to about 425. The addition of about 4 weight percent titanium dioxide to the slurry having about 2 weight percent latex binder increased the modulus of rupture from about 425 (without latex) to about 515 (with latex).

Finally, the addition of 4 weight percent latex to the slurries of the present invention increased the modulus of rupture from about 175 (no added latex) to about 425. The addition of about 4 weight percent titanium dioxide to slurries of the present invention having about 4 weight percent latex increased the modulus of rupture from about 425 (without latex) to about 540.

The present invention has been described with reference to preferred embodiments. Other embodiments of the invention will be apparent to those of skill in the art from the consideration of this specification or practice of the invention disclosed herein. It is intended that the specification and examples be considered as exemplary only, with the true scope and spirit of the invention being indicated by the following claims.

We claim:

1. A method for forming a mold for casting an article from a reactive metal, comprising the steps of:
   providing fused yttria-zirconia having from about 0.1 weight percent to about 20.0 weight percent zirconia;
   forming an aqueous slurry of the fused yttria-zirconia;
   applying the aqueous slurry to a pattern to form a facecoat of the slurry on the pattern;
   building up a mold on the pattern having the facecoat; and
   forming the mold by removing the pattern.

2. The method according to claim 1 and further including the step of engaging the first layer with a reactive metal.

3. The method according to claim 1 wherein the pattern defines a cavity for receiving a molten metal.

4. The method according to claim 1 wherein the yttria-zirconia mixture has from about 1.0 weight percent to about 10.0 weight percent zirconia.

5. The method according to claim 1 wherein the yttria-zirconia mixture has from about 5.0 weight percent to about 7.5 weight percent zirconia.

6. The method according to claim 1 wherein the step of forming an aqueous slurry comprises forming an aqueous slurry comprising fused yttria-zirconia and an inorganic binder.

7. The method according to claim 6 wherein the inorganic binder is silica, and the pH of the slurry is about 9-10.

8. The method according to claim 1 wherein the step of forming an aqueous slurry comprises forming an aqueous slurry comprising fused yttria-zirconia, an inorganic binder and an organic binder.

9. The method according to claim 8 wherein the inorganic binder is silica and the organic binder is latex.

10. The method according to claim 1 wherein the step of forming an aqueous slurry comprises forming an aqueous slurry comprising fused yttria-zirconia, an inorganic binder, an organic binder, a surfactant and an antifoaming agent.

11. The method according to claim 10 wherein the inorganic binder is silica, the organic binder is a latex binder having an anionic or non-ionic charge and which forms a film upon drying at a temperature of less than about 70° F., the surfactant is a sodium dioctyl sulfosuccinate, the antifoaming agent is a water-dilutable active silicone defoamer, and the pH of the slurry is 9-10.

12. The method according to claim 1 wherein the step of immersing further comprises immersing a pattern that includes a facecoat formed from the slurry.

13. A method for casting a reactive metal, comprising the steps of:
   providing fused yttria-zirconia having from about 0.1 weight percent to about 20 weight percent zirconia;
   forming an aqueous slurry containing colloidal silica and from about 75 weight percent to about 85 weight percent fused yttria-zirconia;
   applying the slurry to a pattern to form a facecoat of the slurry on the pattern;
   building a mold on the pattern having the facecoat;
   forming the mold by removing the pattern; and
   casting a reactive metal in the mold.

14. The method according to claim 13 wherein the yttria-zirconia material has from about 5.0 weight percent to about 10.0 weight percent zirconia.

15. The method according to claim 14 wherein the yttria-zirconia material has from about 5.0 weight percent to about 7.5 weight percent zirconia.

16. The method according to claim 13 wherein the slurry further comprises an organic binder.

17. The method according to claim 16 wherein the organic binder is latex.

18. The method according to claim 13 wherein the step of forming an aqueous slurry comprises forming an aqueous slurry comprising fused yttria-zirconia, an inorganic binder, an organic binder, a surfactant and an antifoaming binder.

19. The method according to claim 18 wherein the inorganic binder is colloidal silica, the organic binder is a latex binder having an anionic or non-ionic charge and which forms a film upon drying at a temperature of less than about 70° F., the surfactant is a sodium dioctyl sulfosuccinate having a molecular weight of about 444, the antifoaming agent is a water-dilutable active silicone defoamer and the pH of the slurry is 9-10.

20. A method for casting a reactive metal, comprising the steps of:
   providing fused yttria-zirconia having from about 1.0 weight percent to about 10.0 weight percent zirconia;
   initially forming a large body of an aqueous slurry containing from about 75 weight percent to about 85 weight percent fused yttria-zirconia material and a binder, the aqueous slurry having a viscosity;
   adjusting the viscosity of the slurry to a value from about 350 centipoise to about 500 centipoise at 0.1 $s^{-1}$;
   sequentially applying the slurry to plural patterns to form a facecoat of the slurry on the patterns;
   forming a plurality of molds by removing the patterns; and
   casting a reactive metal in the molds.

* * * * *